(No Model.)
E. PECKHAM.
CAR WHEEL.
No. 376,724. Patented Jan. 17, 1888.
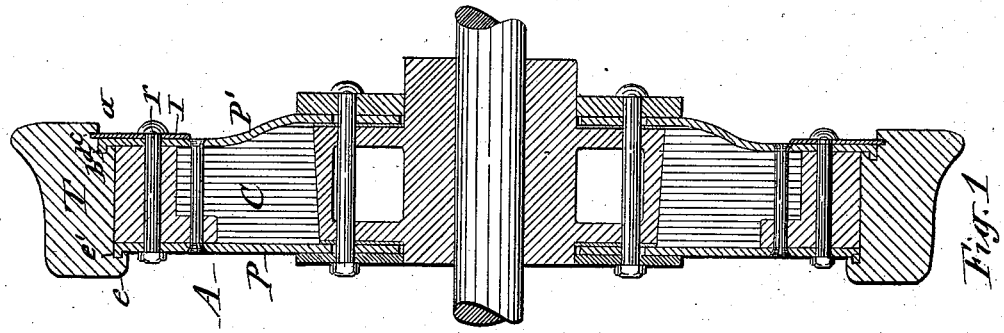
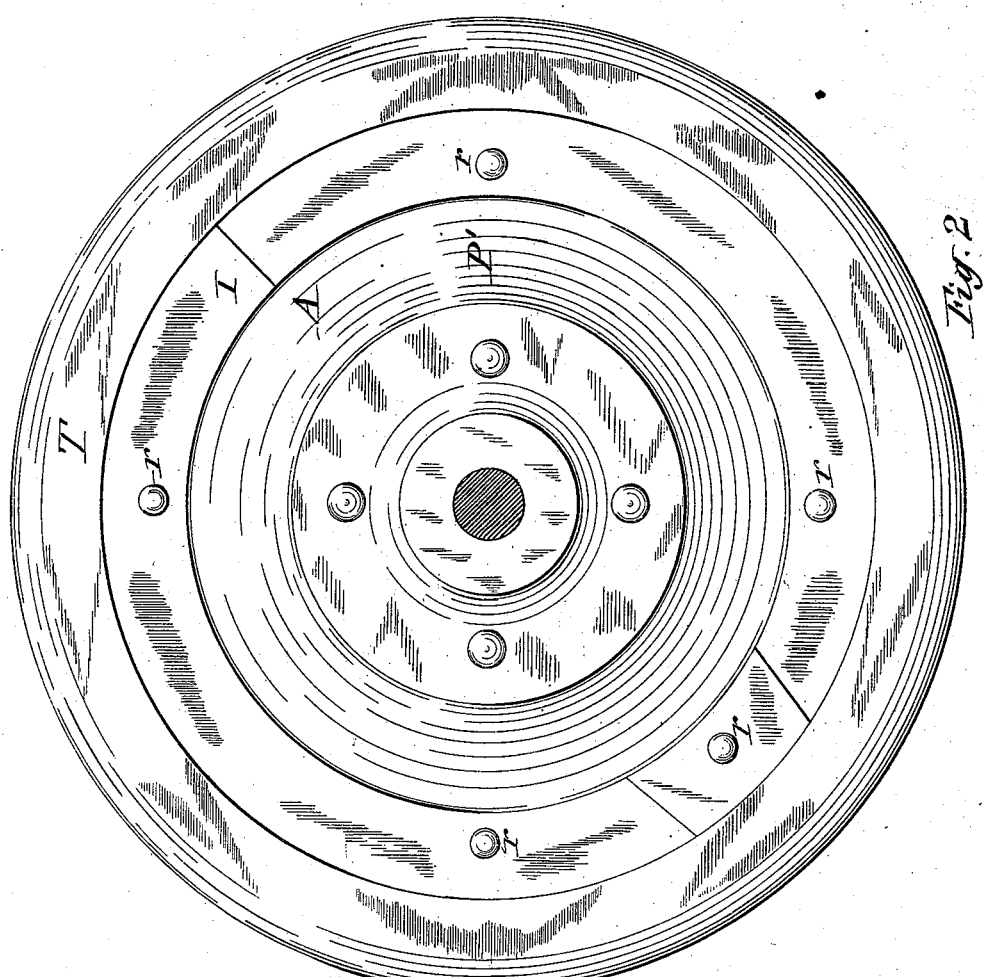
WITNESSES: 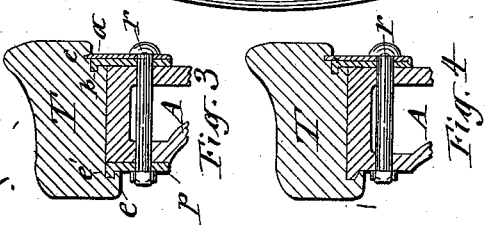 INVENTOR:
Edgar Peckham
BY
ATTORNEYS.

UNITED STATES PATENT OFFICE.

EDGAR PECKHAM, OF SYRACUSE, NEW YORK, ASSIGNOR TO THE PECKHAM CAR WHEEL COMPANY, OF NEW YORK.

CAR-WHEEL.

SPECIFICATION forming part of Letters Patent No. 376,724, dated January 17, 1888.

Application filed October 20, 1887. Serial No. 252,898. (No model.)

*To all whom it may concern:*

Be it known that I, EDGAR PECKHAM, of Syracuse, in the county of Onondaga, in the State of New York, have invented new and useful Improvements in Car-Wheels, of which the following, taken in connection with the accompanying drawings, is a full, clear, and exact description.

This invention relates to the class of car-wheels which have the tire formed separate from the body of the wheel; and the invention consists in improved means for securing the tire on the wheel-body, as hereinafter fully described, and specifically set forth in the claims.

In the annexed drawings, Figure 1 is a transverse section of my improved tire-lock applied to a car-wheel containing a paper or non-metallic core. Fig. 2 is a rear face view of said wheel, and Figs. 3 and 4 are transverse sections of modifications of my invention.

Similar letters of reference indicate corresponding parts.

A represents the wheel-body, and T the tire. The inner peripheral face of the tire I form at one side with the undercut inward projection $e$, and the opposite side of said face of the tire I provide with a circumferential rabbet, $a$, and with circumferential grooves $b$ and $c$ in the two walls of said rabbet. The body of the wheel I provide at one side of its periphery with a tongue or flange, $e'$, which interlocks with the undercut projection $e$ of the tire. When the tire is to be secured to a body containing the non-metallic core C, as shown in Fig. 1 of the drawings, I prefer to form the flange $e'$ on the plate P, which is secured to the side of the body and has its periphery flush with that of the body, and when the body is composed of cast-iron I prefer to clamp an annular wrought-metal plate, $p$, on the side of the body and form the flange $e'$ on said plate, as shown in Fig. 3, of the body. On wheels for light cars, however, the plate $p$ may be omitted and the flange $e'$ formed directly on the body, as illustrated in Fig. 4 of the drawings.

From the opposite side of the periphery of the wheel-body projects a plate, P', which in a paper-covered wheel, as shown in Fig. 1 of the drawings, constitutes one of the side plates of the body, and in a cast-iron wheel the aforesaid plate is of the shape of a ring clamped onto the side of the body by bolts or rivets passing through the same, as represented in Figs. 3 and 4 of the drawings. This plate P' projects into the rabbet $a$ of the tire and is formed at its outer periphery with a flange, $d$, projecting therefrom in the same direction in which the flange $e'$ projects. Said flange $d$ enters into the groove $b$. On the exterior of the plate P', I clamp the sectional locking plate or ring I, by means of bolts or rivets $r$, passing through the respective plates and intervening body. The plate I projects with its outer edge into the groove $c$ of the tire, and thus locks the tire on the body, so as to effectually prevent the former from slipping laterally on the latter.

It will be observed that the described construction and combination of parts allow the tire to be applied to the wheel and to be removed when required, while maintaining the body of the wheel intact, by simply removing the locking plate or ring I and tying the plates P P' to the sides of the usual outer ring, D, of the paper-cored wheel by temporarily-introduced bolts. The flanges $d$ and $e'$ projecting in one and the same direction allow the tire to be slipped laterally onto and off from the wheel-body.

Having described my invention, what I claim as new, and desire to secure by Letters Patent, is—

1. In a car-wheel tire lock, the combination of the tire provided at the edge of its inner peripheral face with the rabbet $a$ and the grooves $b$ and $c$ in the two walls of said rabbet, a plate projecting from the periphery of the wheel-body and into the rabbet $a$, and provided with the flange $d$, entering the groove $b$, and a retaining-plate clamped on the exterior of the aforesaid body-plate and entering with its outer edge into the groove $c$, substantially as described and shown.

2. The combination, with the wheel-body, of plates secured to opposite sides of the body, one of said plates being flush with the periphery of the body, and the other plate projecting from said body, and both of said plates being provided at their outer peripheries with lateral flanges projecting in one and the same direction, the tire formed at one side of its inner peripheral face with an undercut inward projection interlocking with the flange of the aforesaid flush plate, and the opposite side of the aforesaid face of the tire being provided with the rabbet $a$ and grooves $b$ and $c$ in the walls of the rabbet, said rabbet, with its groove $b$, receiving the aforesaid projecting plate with its flange, the locking-plate I entering with its outer edge into the groove $c$, and bolts or rivets $r$, clamping the respective plates onto the wheel-body, substantially as described and shown.

In testimony whereof I have hereunto signed my name, in the presence of two witnesses, at Syracuse, in the county of Onondaga, in the State of New York.

EDGAR PECKHAM. [L. S.]

Witnesses:
HOWARD P. DENISON,
C. L. BENDIXON.